(12) United States Patent  
Bezos (10) Patent No.: US 6,275,165 B1  
(45) Date of Patent: Aug. 14, 2001

(54) A.A.R. COMPLIANT ELECTRONIC BRAKING SYSTEM

(75) Inventor: Angel P. Bezos, Rockville, MD (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/044,352

(22) Filed: Mar. 19, 1998

(51) Int. Cl.[7] ................................................. G05B 23/02
(52) U.S. Cl. .......................... 340/825.06; 700/3; 700/9; 303/7; 303/9; 303/15; 303/37; 303/85; 246/182 R
(58) Field of Search .......................... 340/825.06; 700/3, 700/9; 246/187 C, 167 R; 303/7, 15, 9; 714/8, 25; 370/242, 341

(56) References Cited

U.S. PATENT DOCUMENTS

| | | | |
|---|---|---|---|
| 3,985,401 | * | 10/1976 | Worbois .................................. 303/85 |
| 4,344,138 | * | 8/1982 | Frasier .................................... 701/70 |
| 4,690,463 | * | 9/1987 | Hart ........................................ 303/37 |
| 5,681,015 | * | 10/1997 | Kull ................................. 246/187 C |
| 5,722,736 | * | 3/1998 | Cook ........................................ 303/15 |
| 5,791,744 | * | 8/1998 | Wood et al. .............................. 303/7 |
| 5,833,325 | * | 11/1998 | Hart ......................................... 303/7 |
| 5,862,048 | * | 1/1999 | Knight ..................................... 700/9 |
| 5,950,967 | * | 9/1999 | Montgomery .................... 246/182 R |

* cited by examiner

*Primary Examiner*—Brian Zimmerman  
*Assistant Examiner*—Yves Dalencourt  
(74) *Attorney, Agent, or Firm*—James Ray & Associates (57) ABSTRACT

A system reliably communicates brake commands from a master controller on a lead locomotive to the brake equipment on each rail vehicle of a freight train. The system includes a mechanism for detecting whether the brake commands are being successfully communicated over a communications channel that is normally used to convey such commands from the master controller to the brake equipment on each rail vehicle. The system also includes on each rail vehicle a mechanism for communicating the brake commands that is independent of the communications channel. The mechanism for communicating conveys the brake commands from the lead locomotive to the rail vehicles only when the mechanism for detecting determines that communication over the communications channel has failed. The system further includes on each rail vehicle a mechanism for receiving the brake commands from the lead locomotive via the mechanism for communicating. The system additionally includes on each rail vehicle a mechanism for acting upon the brake commands received from the mechanism for receiving so that the brake equipment can execute the brake commands as if they were conveyed to the brake equipment over the communications channel.

22 Claims, 4 Drawing Sheets

A.A.R. COMPLIANT ELECTRONIC BRAKING SYSTEM

FIELD OF THE INVENTION

The present invention generally relates to a system for conveying commands between the vehicles of a train. More particularly, the invention relates to a system for reliably communicating brake commands from a master controller on a locomotive to brake equipment on the vehicles of a freight train.

BACKGROUND OF THE INVENTION

A typical freight train includes one or more locomotives, a plurality of railcars and several trainlines. The trainlines include both pneumatic and electrical lines some of which run from the lead locomotive to the last rail vehicle in the train. One pneumatic trainline especially important to a freight train is the brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that is required by the brake control system to charge the reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency position at another extreme in which brake pipe pressure is zero and the brakes are fully applied. The brake handle positions include brake release, minimum service brake application, full service brake application and emergency brake application.

The brake control system on a freight train is ultimately controlled from the lead locomotive through a master controller. The inputs from the brake handle are typically processed by a cab unit and then passed to the master controller. Also referred to as the head end unit (HEU), the master controller operates according to instructions contained within its programming code. In response to these and other inputs, the master controller formulates a brake command appropriate to current conditions and issues it to each of the vehicles in the train. The HEU can order through the brake command any action from a release of brakes to an emergency application of brakes or any degree of brake application in between those two extremes. The precise degree of brake application ordered by the HEU is typically conveyed in terms of a percentage of the pressure required for full service brake application. Zero percent (0%) is typically designated for a release of brakes, 15% for a minimum service brake application, 100% for a full service brake application and 120% for an emergency brake application.

On a freight train, the brake command is typically conveyed to each of the rail vehicles in the form of an electrical signal using a two wire electrical trainline. The electrical trainline is typically contained with a protective conduit. Similar to the brake pipe, the electrical trainline actually constitutes a series of individual conduits. One individual conduit secured to the underside of each vehicle interconnects to another such conduit via a connector between each rail vehicle.

The brake equipment on each railcar of a freight train includes one or more brake cylinders, various electropneumatic valves, an air reservoir and a car control unit (CCU). Each CCU has its own unique identification code that is used for reporting its information to the master controller. Each CCU interprets and acts upon the electrical signal and controls the pressure contained within its corresponding reservoir.

The CCU typically includes a transceiver unit controlled by a microprocessor. The transceiver unit is connected to the electrical trainline from which it receives the electrical signal that carries the brake command issued by the master controller. The transceiver unit converts the electrical signal into a form usable by the microprocessor. In a manner known in the brake control art, the microprocessor controls the electropneumatic valves through which pressurized air can be supplied to or exhausted from the brake cylinders on the railcar according to the dictates of the particular brake command received. For example, in response to a command to apply the brakes, the microprocessor controls the electropneumatic valves so as to supply pressurized air to the brake cylinders. The brake cylinders convert this pressure to mechanical force. The mechanical force is then transferred to the brakes so as to slow or stop the rotation of the wheels on the railcar as commanded. Assuming the brake command is successfully communicated throughout the train, the brakes of all the railcars in the train respond in generally the same manner.

The communications network on board a freight train is typically comprised of the master controller in the lead locomotive and the CCU on board each railcar as well as the communications channel through which they communicate. The HEU is responsible for most of the communication over the network. Specifically, the HEU sends the most recently formulated brake command at a predetermined rate (e.g., every second) to each of the railcars. Sequentially or according to other criteria, the HEU also includes in each brake command a status query addressed to one railcar to determine whether the selected CCU is attentive to the brake control system. When so queried, a selected CCU will respond to the interrogation by sending to the master controller a signal in acknowledgement of the query. The acknowledgement takes the form of the identification code. More typically, the acknowledgement will also be accompanied by information such as reservoir pressure, brake pipe pressure, brake cylinder pressure, battery voltage and whether the brakes on the railcar or one of its trucks are cut-in (enabled) or cut out (disabled). By its response, the selected CCU informs the HEU that it is a properly operating part of the communications network. A CCU may also broadcast an exception message on the network should any of the following conditions occur: improper brake cylinder pressure, reservoir fails to charge, pressure in brake pipe or reservoir less than 50 psi or loss of communications. Specific control messages may also be issued by the CCU in response to certain circumstances as is well known in the brake control art.

The American Association of Railroads (AAR) has issued a specification entitled "Performance Requirement For Testing Electrically Controlled Pneumatic (ECP) Freight Brake Systems," Revision Number 8, dated Aug. 5, 1996. It is incorporated into this document by reference. The AAR specification defines how an ECP brake control system should respond to certain faults in communication over the communications network of a freight train. The AAR Document provides, for example, that should a fault occur that prevents the master controller from issuing brake commands to the CCUs, the CCUs shall self authorize each other to apply the brakes on the railcars. Specifically, the CCUs communicate with each other to determine how many of the CCUs are cutoff from the master controller. Operating according to directions contained in its programming code, each CCU orders an emergency application of brakes on its railcar if it has been collectively determined that a critical number of CCUs are cutoff from the master controller.

Section 3.3.2.2.2 of the AAR specification indicates that a CCU is programmed to release the brakes on its railcar should the CCU be unable to communicate with any other vehicle in the freight train. This prevents the affected railcar from applying its brakes (and damaging its wheels via sliding on the tracks) while the train continues to its destination. When the uncommunicative CCU fails to respond to the status query directed to it by the HEU, the HEU not only warns the train operator that the queried CCU failed to respond but also apprises the operator of the location that the failed CCU occupies in the train. Similarly, should each CCU in a group of railcars be unable to communicate with any other vehicle, the brakes of each railcar in that group would release. Only when more than a predetermined percentage (e.g., 15%) of CCUs lose the ability to communicate will the HEU warn the train operator to apply the brakes. If the train operator fails to respond to the warning within a given time, the HEU will automatically impose a penalty brake application by which it orders each of the remaining communicative CCUs to fully apply the brakes. Through this control logic, the master controller prevents the train from operating without sufficient braking power under almost all conditions.

Section 3.3.2.2.2 of the AAR specification, however, appears not to address a worst case scenario in which every CCU on the train loses its ability to communicate. If a failure of such magnitude were to occur, the brakes on every railcar would release, leaving the HEU with only the brakes on the locomotives to stop the train. Though unlikely to occur, such a failure could happen if even only one of the CCUs fails in such a way as to continuously transmit over the communications network. Such aberrant transmission by one CCU would completely prevent the HEU from transmitting to the other CCUs that are operating properly. There may conceivably be other types of failures that could completely prevent communications over the communications network. It is therefore desirable to introduce an invention that would overcome the shortcomings of the freight train brake control system prescribed by the current AAR specification.

It should be noted that the foregoing background information is provided to assist the reader in understanding the present invention. Accordingly, any terms used herein are not intended to be limited to any particular narrow interpretation unless specifically stated otherwise in this document.

SUMMARY OF THE INVENTION

In a presently preferred embodiment, the present invention provides a system for reliably communicating brake commands from a master controller on a lead locomotive to the brake equipment on each rail vehicle of a freight train. The system includes a means for detecting whether the brake commands are being successfully communicated over a communications channel that is normally used to convey such commands from the master controller to the brake equipment on each of the rail vehicles. The system also includes on each rail vehicle a means for communicating the brake commands that is independent of the communications channel. The means for communicating conveys the brake commands from the lead locomotive to the rail vehicles when the means for detecting determines that communication over the communications channel has failed. The system further includes on each rail vehicle a means for receiving the brake commands from the lead locomotive via the means for communicating. The system additionally includes on each rail vehicle a means for acting upon the brake commands received from the means for receiving so that the brake equipment can execute the brake commands as if they were conveyed to the brake equipment over the communications channel.

In a related aspect, the present invention provides a system for preventing shutdown of communication over a communications network of a freight train. The communications network includes communication between a master controller on a lead locomotive and a car control unit on each rail vehicle of the train. The system includes on each rail vehicle a means for detecting whether the car control unit is transmitting aberrantly over the communications network in such a way as to disrupt communication over the communications network of the train. The system also includes on each rail vehicle a means for cutting off the car control unit from the communications network. The means for cutting off prevents the car control unit from transmitting when the means for detecting determines that the car control unit has disrupted communications over the communications network.

OBJECTIVES OF THE INVENTION

It is a primary objective of the present invention to provide a system that reliably communicates brake commands from the lead locomotive to the railcars of a freight train even if one or more components completely prevent communication of brake commands over the communications network of the train.

Another objective of the present invention is to provide a system that can prevent a component from shutting down communications over the communications network.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

DETAILED DESCRIPTION OF THE INVENTION

Before describing the invention in detail, the reader is advised that, for the sake of clarity and understanding, identical components having identical functions in each of the accompanying drawings have been marked where possible with the same reference numerals in each of the Figures provided in this document.

Figure 1:
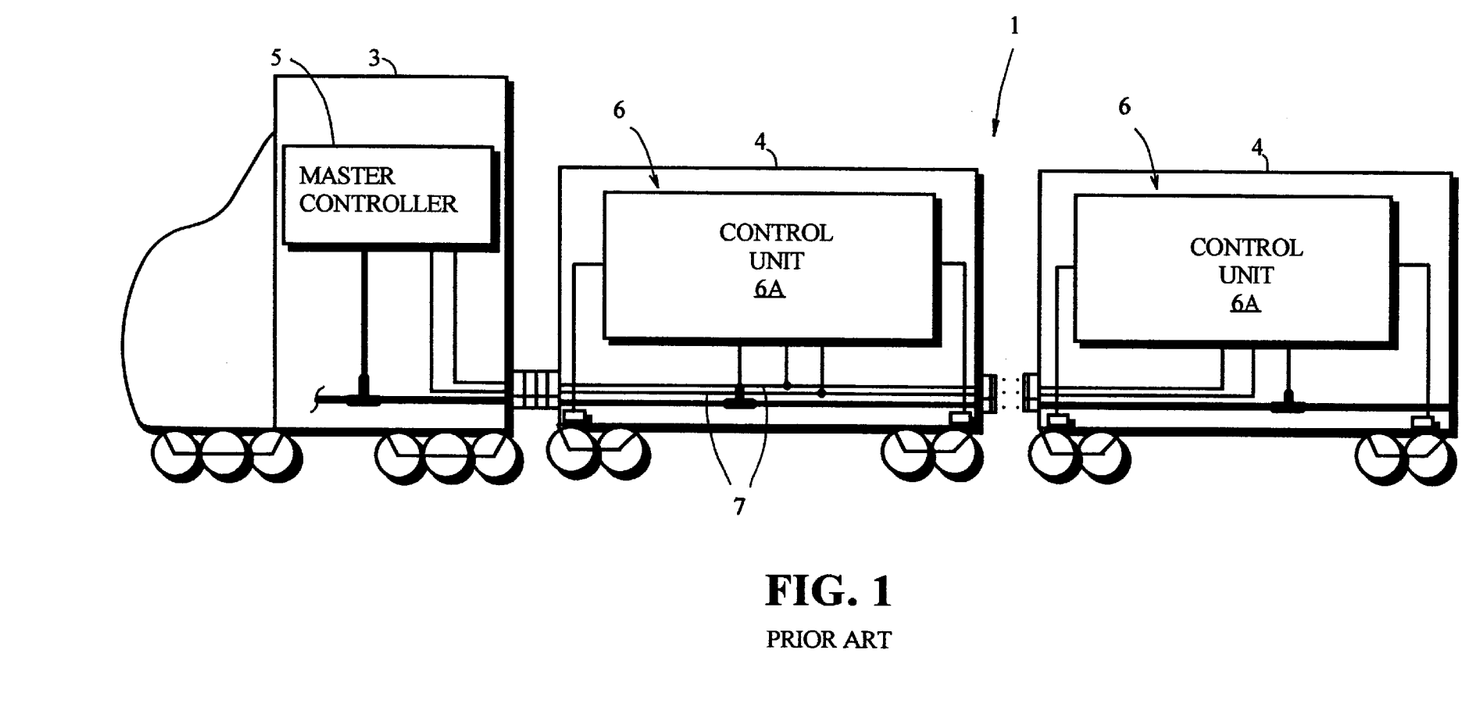
FIG. 1 is a block diagram of a freight train featuring a prior art electropneumatic brake control system.
Figure 2:
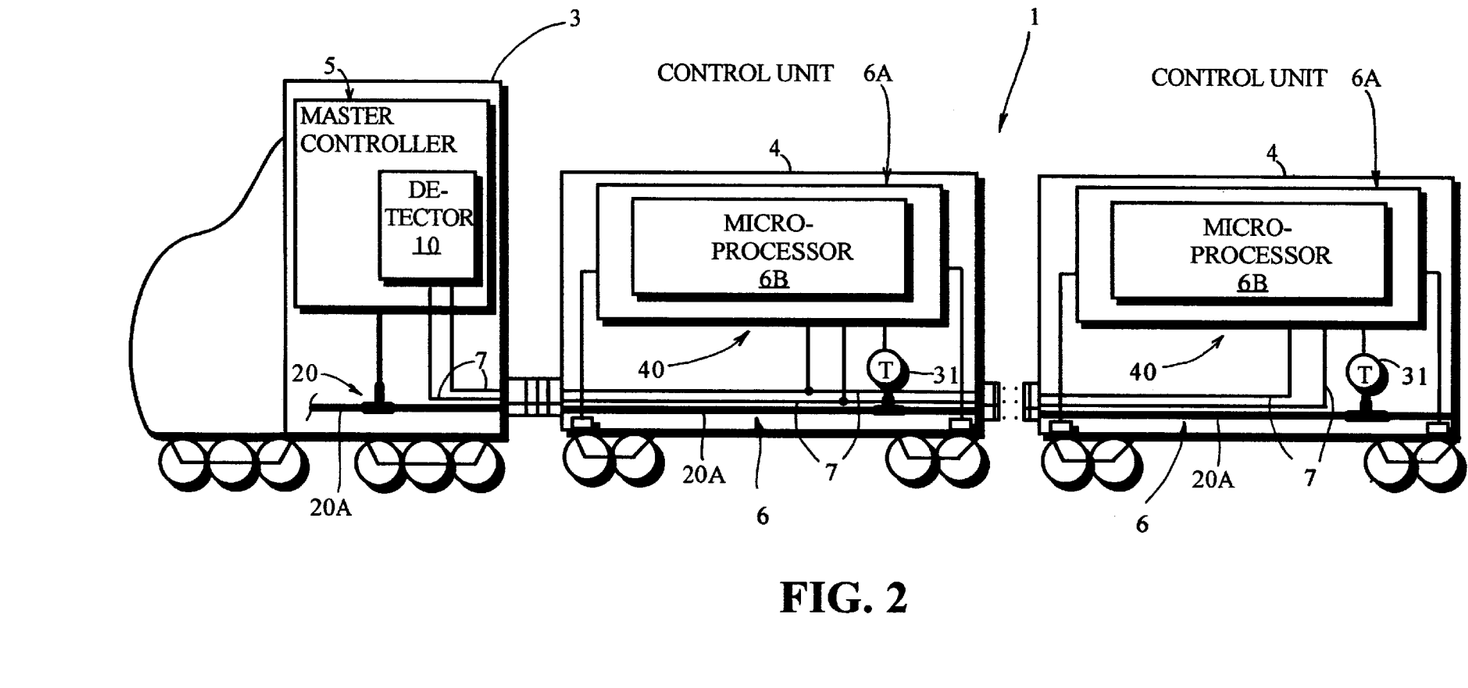
FIG. 2 is a block diagram of a freight train including an electropneumatic brake control system that features a presently preferred embodiment of the invention.
Figure 3:
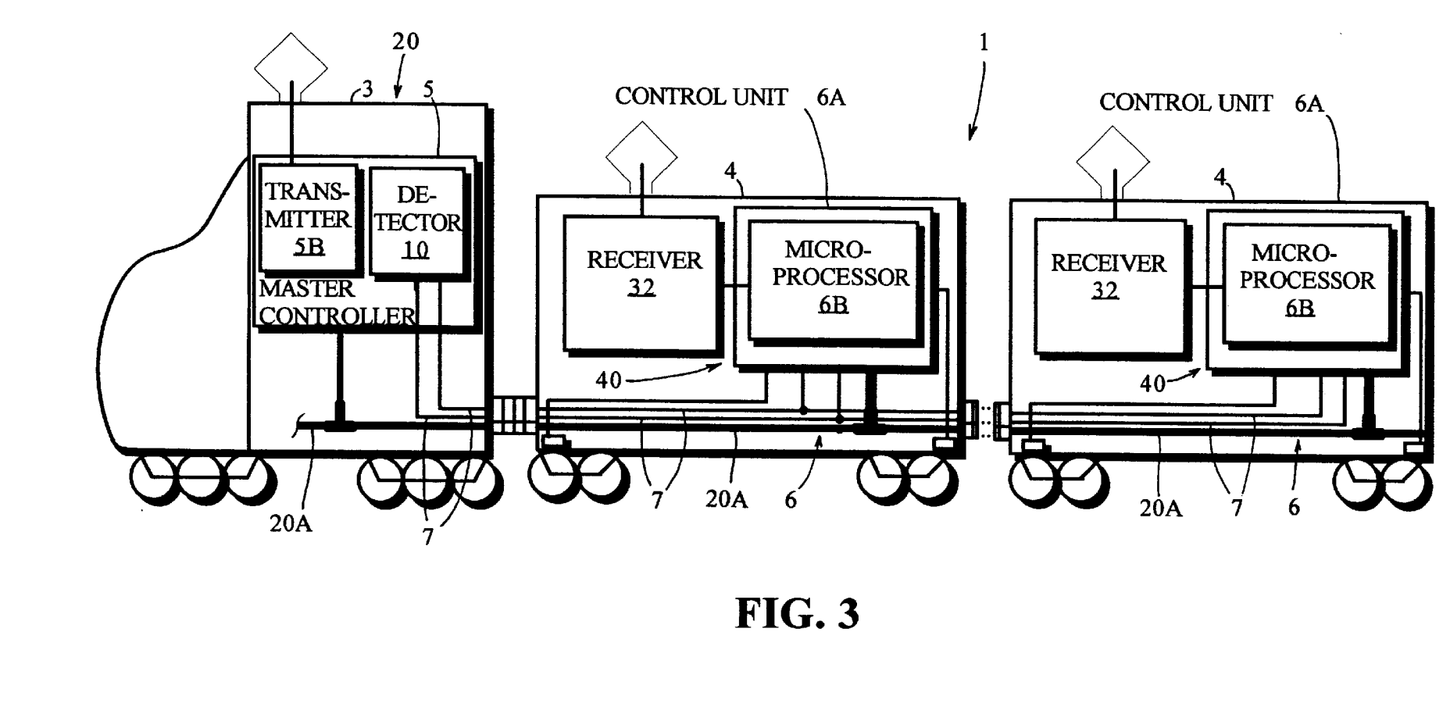
FIG. 3 is a block diagram of a freight train including an electropneumatic brake control system that features an alternative embodiment of the invention.

FIGS. 2 and 3 each illustrate one embodiment of a system that can be used to reliably communicate brake commands from a master controller on a lead locomotive to the brake equipment on each railcar of a freight train. Described in greater detail in the ensuing paragraphs, each embodiment includes a means for detecting 10, a means for communicating 20, a means for receiving 30 and a means for acting 40. Using these basic elements, the present invention can be implemented as part of an ECP brake control system on a freight train or a similarly configured train such as the train illustrated in FIG. 1.

Referring still to FIGS. 2 and 3, the means for detecting 10 is used to determine whether the brake commands are being successfully communicated over a communications channel 2. The communications channel 2 interconnects the lead locomotive 3 with each of the railcars 4 in the train. As described in the background, the communications channel 2 is the route through which the brake control system normally conveys the brake commands from the master controller 5 to the brake equipment 6 on each of the railcars 4 in the freight train 1.

The means for detecting 10 may be manifested either as a device incorporated into the master controller 5 or as a device physically separate from the master controller. For simplicity of illustration, however, the means for detecting 10 is shown in FIGS. 2 and 3 only in its preferred manifestation within the master controller. Whether as part of or independent of the master controller 5, the means for detecting 10 monitors communication over the communications channel 2 to determine whether the brake commands are being successfully communicated from the master controller 5 to the brake equipment 6 on the railcars.

The means for detecting 10 can be designed to perform any one or more of a variety of known techniques to determine whether communication over the communications channel 2 has failed. For example, the means for detecting 10 could employ CRC (cyclic redundancy checking) or like verification testing to determine the rate of error in the transmission of communications between the master controller and the car control units (CCUs) 6a in the railcars. The means for detecting 10 could be set so that a preset number of successful communications is required within every prespecified time period. Failure would then be declared if the rate of error exceeds a predetermined failure rate. Similarly, the means for detecting 10 could be used to determine whether the signals conveyed over the communications channel fall within preset tolerances. Only if the means for detecting 10 actually detects one or more signals that deviate impermissibly from the preset tolerances will failure be declared.

The means for communicating 20 is ideally independent of the communications channel 2. When the means for detecting 10 determines that communication over the communications channel 2 has failed, the means for communicating 20 conveys the brake commands from the master controller 5 in the locomotive to the railcars. In the absence of a failure of communication over the communications channel 2, the brake commands, of course, are conveyed to the railcars 4 along the electrical trainline 7.

Referring now to the presently preferred embodiment of the invention shown in FIG. 2, the means for communicating 20 includes a pneumatic trainline 20a through which to communicate each brake command as a pneumatic signal from the master controller 5 to each of the railcars 4. The pneumatic trainline 20a, of course, is preferably selected to be the brake pipe of the train 1. The pneumatic signal may embody a command requiring either a service brake application, an emergency brake application or any other brake application recognizable by the brake equipment 6 on the railcars 4. In this preferred embodiment, the means for receiving 30 thus includes a transducer device 31 on each railcar through which to convert the pneumatic signal conveyed along the pneumatic trainline 20a to an electrical signal useable by the means for acting 40. The transducer device 31 would monitor the brake pipe, either continuously or when the CCU 6a is unable to communicate, for the pneumatic signal.

The means for acting 40 on each railcar may be manifested either as the CCU or as a separate microprocessor based device. For simplicity of illustration, the means for acting 40 is shown in FIG. 2 only in its preferred manifestation as the CCU 6a with its own microprocessor 6b. This manifestation is preferred, of course, for obvious reasons such as lower cost and less weight. When the CCU serves as the means for acting 40, the CCU 6a receives the electrical signal from the transducer device 31. The CCU 6a then controls the electropneumatic valves on the railcar according to the dictates of the particular brake command(s) received. The electropneumatic valves supply pressurized air to or exhaust it from the brake cylinders on the railcar as ordered by their CCU 6a in a manner well known in the brake control art. The CCU 6a is thus enabled to execute the electrical signal in a manner that it normally would have executed the brake command had the brake command been communicated over the communications channel 2.

Should it be necessary for the means for acting 40 to be implemented as a separate microprocessor device, the microprocessor device would perform essentially the same functions as the CCU 6a described in the previous paragraph. The microprocessor device would receive the electrical signal from the transducer device 31. In the previously indicated well known manner, it would then control the electropneumatic valves on the railcar according to the dictates of the particular brake command(s) received. The microprocessor device would then execute the electrical signal in a manner that the CCU would normally have executed the brake command had the brake command been communicated over the communications channel 2 rather than the pneumatic trainline 20a.

Whether the means for acting 40 is implemented as the CCU 6a or as the separate microprocessor device, the means for acting 40 may be preprogrammed to execute whatever type of brake action is desired by the train authority in response to the electrical signal received from the transducer device 31. The brake action, for example, could be a minimum service brake application, an emergency brake application or any degree of brake application in between those two extremes.

Referring now to an alternative embodiment of the present invention shown in FIG. 3, the means for communicating 20 includes a radio frequency channel through which to communicate the brake commands as a radio signal from a transmitter 5b controlled by master controller 5 to each of the railcars 4. The radio signal may embody a command requiring either a service brake application, an emergency brake application or any other brake application recognizable by the brake equipment 6 on the railcars 4. In this alternative embodiment, the means for receiving 30 thus includes a receiver 32 on each railcar through which to convert the radio signal received from the transmitter 5b to an electrical signal useable by the means for acting 40.

The means for acting 40 in this alternative embodiment may also be manifested either as the CCU or as a separate microprocessor based device. For simplicity of illustration, the means for acting 40 is shown in FIG. 3 only in its preferred manifestation as the CCU 6a with its own microprocessor 6b. When the CCU serves as the means for acting 40, the CCU 6a receives the electrical signal from the receiver 32. The CCU 6a then controls the electropneumatic valves on the railcar according to the dictates of the particular brake command(s) received. The electropneumatic valves supply pressurized air to or exhaust it from the brake cylinders on the railcar as ordered by their CCU 6a in a manner well known in the brake control art. The CCU 6a is thus enabled to execute the electrical signal in a manner that it normally would have executed the brake command had the brake command been communicated over the communications channel 2.

Regarding the means for acting 40 if implemented as a separate microprocessor device, the microprocessor device would perform essentially the same functions as those previously attributed to the CCU microprocessor 6b. The microprocessor device would receive the electrical signal from the receiver 32 and control the electropneumatic valves on the railcar according to the dictates of the brake command (s). The microprocessor device would then execute the electrical signal in a manner that the CCU microprocessor 6b would have executed the brake command had the brake command been communicated over the communications channel 2 rather than the radio frequency channel.

Whether the means for acting 40 is implemented as the CCU 6a or as the separate microprocessor device, the means for acting 40 may be preprogrammed to execute whatever type of brake action is desired by the train authority in response to the electrical signal received from the receiver 32. The brake action, as described previously, could be a minimum service brake application, an emergency brake application or any degree of brake application in between those two extremes.

Figure 4:
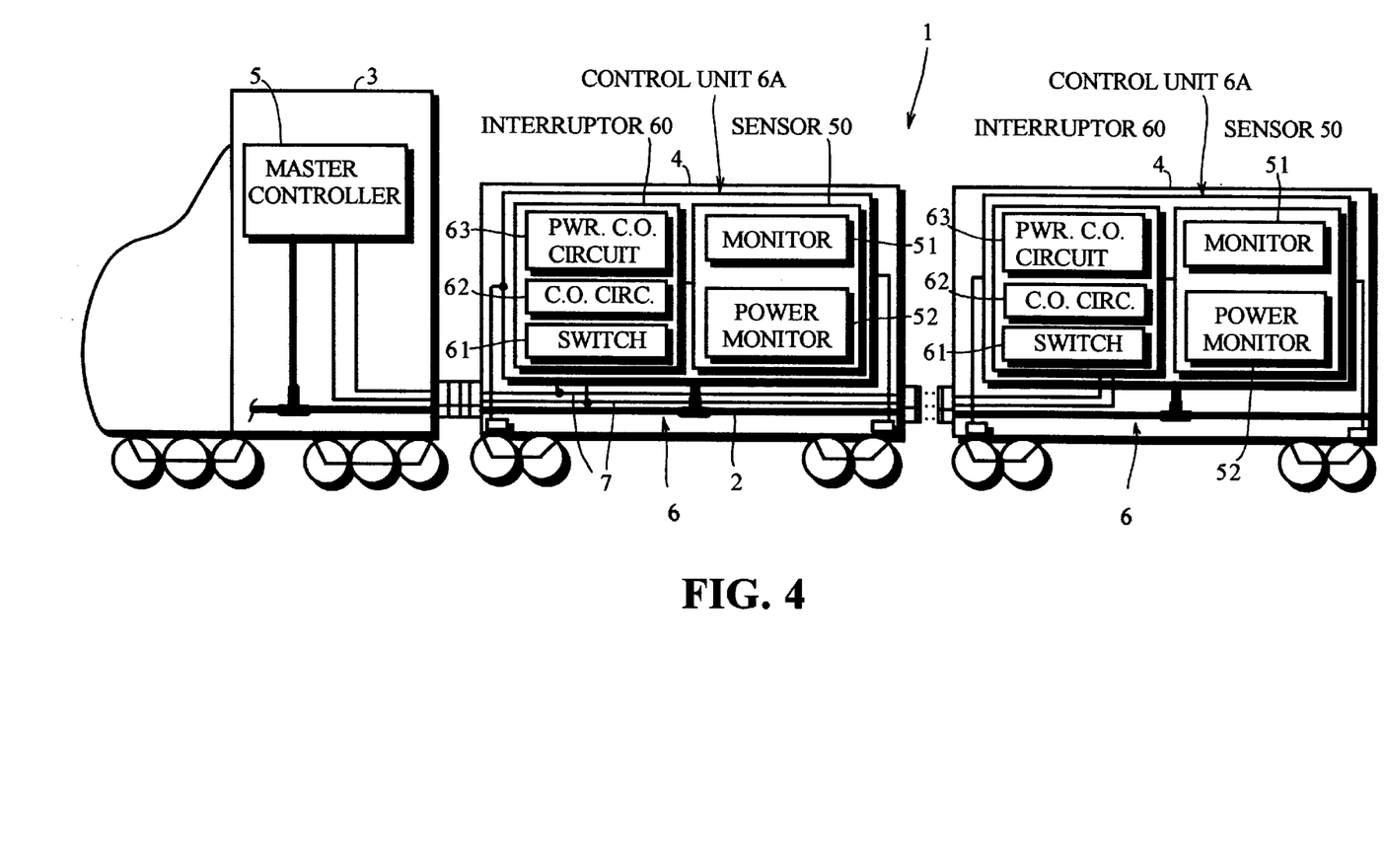
FIG. 4 is a block diagram of a freight train including an electropneumatic brake control system that features an aspect of the invention that may be implemented along with one or both embodiments of the invention.

The presently preferred and alternative embodiments of the invention each provide a way to reliably communicate brake commands from the master controller 5 to the railcars 4 if a problem should arise that prevents the brake commands from being communicated over the communications channel. Referring now to a related aspect of the invention that is preferably employed in one or both embodiments or even used by itself, FIG. 4 illustrates a network control system that prevents shutdown of communication over a communications network of the train 1. The communications network comprises the communication between the master controller 5 and the CCUs 6a on the railcars 4 of the train.

The network control system features on each rail vehicle a means for sensing 50 and a means for cutting off communication 60. The means for sensing 50 ascertains whether the CCU is transmitting aberrantly in such a way as to disrupt communication over the communications network of the freight train 1. When the means for sensing 50 has determined that the CCU 6a has indeed disrupted communications over the communications network, the means for cutting off 60 prevents the CCU 6a from transmitting onto the communications network. Using these basic constituents, the network control system can be implemented within an ECP brake control system on a freight train or similarly configured train such as the train illustrated in FIG. 1.

Referring still to FIG. 4, the means for sensing 50 may be manifested either in the CCU or as a separate device independent of the CCU. So, too, may the means for cutting off communication 60. For simplicity of illustration, the means for sensing 50 and the means for cutting off communication 60 are shown in FIG. 4 only in their preferred manifestation within the CCU 6a. Whether as part of or as a device separate from the CCU, the means for sensing 50 could employ any one or more of a variety of techniques to determine whether the CCU is transmitting aberrantly in such a way as to disrupt communication over the communications network.

It is well known that an individual CCU transceiver transmits over the communications network far less often than does the master controller. The master controller 5 transmits brake commands at the predetermined rate to the railcars 4 with a status query directed to one railcar for every brake command issued. Each CCU transceiver 6a, in contrast, merely responds to the status query directed to it and only under certain conditions will it convey exception or control messages. The duty cycle of the HEU transceiver 5 is therefore much greater than the duty cycle of any one of the CCU transceivers 6a.

It is also well known that the time it takes for a CCU 6a to transmit a response to a status query or convey a message is on the order of 10 to 20 milliseconds. Current freight train brake control systems thus do not require a CCU to transmit many messages in a short period of time. Without adversely affecting the brake control system, each CCU could then be safely restricted, for example, to a rate of approximately no more than one transmission per second. A typical CCU transceiver therefore exhibits a duty cycle of less than two percent but nevertheless consumes a significant amount of power while transmitting, approximately 5 watts if transmitting continuously. Given the two percent duty cycle, the typical CCU transceiver would consume on average no more than (0.02%) (5 W)=0.1 watts. Consequently, a properly operating CCU transceiver should normally never consume more than a conservatively selected threshold of 0.25 watts, for example.

Described generally, the means for sensing 50 may therefore be devised so that it will conclude that the CCU transceiver 6a has transmitted aberrantly over the communications network if any of a prespecified set of conditions occurs. For example, the means for sensing 50 may determine that the CCU has disrupted communication when the CCU transceiver 6a transmits more than a preset number of communications within a predetermined time period. Alternatively, the means for sensing 50 may determine that disruption has occurred when the CCU transceiver has consumed more than a predetermined amount of power within a prespecified time period. The means for cutting off 60 could thus take the form of a switch 61 that deactivates the CCU transceiver 6a when the means for sensing 50 has determined that the CCU 6a has indeed disrupted communication over the communications network.

Described now in even greater detail, the means for sensing 50, for example, could employ a duty cycle monitoring circuit 51 that monitors the duty cycle of the CCU transceiver 6a. The means for cutting off 60 would then include a cutoff circuit 62 that deactivates the CCU transceiver 6a when the duty cycle monitoring circuit 51 indicates that the duty cycle of the CCU transceiver 6a has exceeded a prespecified percentage. As an alternative example, the means for sensing 50 could employ a power monitoring circuit 52 that monitors how much power is being consumed by the CCU transceiver 6a. The means for cutting off 60 would then include a power cutout circuit 63 that deactivates the CCU transceiver 6a when the power monitoring circuit 52 indicates that the CCU transceiver 6a has consumed more than a predetermined amount of power within a prespecified time period.

The means for sensing 50 and the means for cutting off communication 60 thus together prevent a railcar CCU 6a from shutting down the communications network on a freight train. Besides freight applications, the invention may be applicable to other types of brake control systems as long as they feature the basic design characteristics described in the background section of this document and roughly illustrated in FIG. 1. Obvious modifications of the invention may be necessary, though, depending upon the specific application in which the invention is employed.

The presently preferred and alternative embodiments and related aspects for carrying out the invention have been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, I secure for myself by Letters Patent exclusive rights to all subject matter embraced by the following claims for the time prescribed by the Patent Act.

I claim:

1. A system for reliably communicating a brake command from a master controller on a locomotive to brake equipment on each rail vehicle of a train, said system comprising:
    (a) a means for detecting whether said brake command is being successfully communicated over a communications channel from said master controller to said brake equipment on said rail vehicles, said means for detecting using at least one of the following techniques to determine whether communication has failed:
        (I) a preset number of successful communications have failed to occur over said communications channel within a prespecified time period;
        (II) communication over said communications channel fails to fall within preset tolerances; and
        (III) said brake equipment on at least one of said rail vehicles disruptively transmitting on and thus preventing valid communications over said communications channel;
    (b) a means, independent of said communications channel, for communicating said brake command from said locomotive to said rail vehicles when said means for detecting determines that communication over said communications channel has failed;
    (c) a means, disposed on each said rail vehicle, for receiving said brake command conveyed from said locomotive via said means for communicating; and
    (d) a means, disposed on each said rail vehicle, for acting upon said brake command conveyed from said means for receiving so as to enable said brake equipment on said rail vehicle to execute said brake command as if said brake command were communicated to said brake equipment over said communications channel.

2. The system for reliably communicating said brake command as recited in claim 1 wherein said means for detecting is manifested in any one of the following forms:
    (a) said means for detecting is incorporated into said master controller wherein said means for detecting monitors communication over said communications channel to determine whether said brake command is successfully communicated from said master controller to said brake equipment on said rail vehicles; and
    (b) said means for detecting is a device independent of said master controller through which to monitor communication over said communications channel to determine whether said brake command is successfully communicated from said master controller to said brake equipment on said rail vehicles.

3. The system for reliably communicating said brake command as recited in claim 2 wherein:
    (a) said means for communicating includes a pneumatic trainline through which to communicate said brake command as a pneumatic signal from said master controller to said rail vehicles; and
    (b) said means for receiving includes a transducer device through which to convert said pneumatic signal received from said pneumatic trainline to an electrical signal useable by said means for acting.

4. The system for reliably communicating said brake command as recited in claim 3 wherein said brake equipment on each said rail vehicle includes a car control unit as said means for acting so that said car control unit receives said electrical signal from said transducer device thereby enabling said brake equipment to execute said electrical signal in a manner that said brake equipment would have executed said brake command had said brake command been communicated over said communications channel.

5. The system for reliably communicating said brake command as recited in claim 3 wherein:
    (a) said brake equipment on each said rail vehicle includes a car control unit to which said brake command is directed over said communications channel and which enables said brake equipment to execute said brake command in absence of failure of said communication over said communications channel; and
    (b) said means for acting includes a microprocessor to which said transducer device conveys said electrical signal and which enables said brake equipment to execute said brake command carried by said electrical signal upon failure of said communication over said communications channel.

6. The system for reliably communicating said brake command as recited in claim 3 wherein said pneumatic signal may embody a command requiring any one of a service brake application, an emergency brake application and any other brake application recognizable by said brake equipment on said rail vehicles.

7. The system for reliably communicating said brake command as recited in claim 5 wherein said microprocessor is programmed to execute, in response to said electrical signal received from said transducer device, any one of a service brake application, an emergency brake application and any degree of brake application between a brake release and said emergency brake application.

8. The system for reliably communicating said brake command as recited in claim 2 wherein:
    (a) said means for communicating includes a radio frequency channel through which to communicate said brake command as a radio signal from a transmitter controlled by said master controller; and
    (b) said means for receiving includes a receiver through which to convert said radio signal received from said transmitter to an electrical signal useable by said means for acting.

9. The system for reliably communicating said brake command as recited in claim 8 wherein said brake equipment on each said rail vehicle includes a car control unit as said means for acting so that said car control unit receives said electrical signal from said receiver thereby enabling said brake equipment to execute said electrical signal in a manner that said brake equipment would have executed said brake command had said brake command been communicated over said communications channel.

10. The system for reliably communicating said brake command as recited in claim 8 wherein:

(a) said brake equipment on each said rail vehicle includes a car control unit to which said brake command is directed over said communications channel and which enables said brake equipment to execute said brake command in absence of failure of said communication over said communications channel; and (b) said means for acting includes a microprocessor to which said receiver conveys said electrical signal and which enables said brake equipment to execute said brake command carried by said electrical signal upon failure of said communication over said communications channel.

11. The system for reliably communicating said brake command as recited in claim 8 wherein said radio signal may embody a command requiring any one of a service brake application, an emergency brake application and any other brake application recognizable by said brake equipment on said rail vehicles.

12. The system for reliably communicating said brake command as recited in claim 10 wherein said microprocessor is programmed to execute, in response to said electrical signal received from said receiver, any one of a service brake application, an emergency brake application and any degree of brake application between a brake release and said emergency brake application.

13. A network control system for preventing shutdown of communication over a communications network of a train, said communications network including communication between a master controller on a locomotive and a car control unit on each rail vehicle of said train, said network control system comprising:

(a) a means for sensing, on each said rail vehicle, whether said car control unit is transmitting aberrantly over said communications network so as to cause disruption of said communication over said communications network of said train; and (b) a means, on each said rail vehicle, for cutting off said car control unit from said communications network when said means for sensing determines that said car control unit has caused said disruption of said communication over said communications network.

14. The network control system as recited in claim 13 wherein said means for sensing is manifested in one of the following forms:

(a) said means for sensing is incorporated into said car control unit; and (b) said means for sensing is a device independent of said car control unit.

15. The network control system as recited in claim 14 wherein said means for sensing determines that said car control unit has caused said disruption if a transmitter of said car control unit has transmitted more than a preset number of communications within a predetermined time period.

16. The network control system as recited in claim 15 wherein said means for cutting off includes a switch that deactivates said transmitter when said means for sensing determines that said transmitter has transmitted more than said preset number of communications within said predetermined time period.

17. The network control system as recited in claim 14 wherein said means for sensing determines that said car control unit has caused said disruption if a transmitter of said car control unit has consumed more than a predetermined amount of power within a prespecified time period.

18. The network control system as recited in claim 17 wherein said means for cutting off includes a switch that deactivates said transmitter when said means for sensing determines that said transmitter has consumed more than said predetermined amount of power within said prespecified time period.

19. The network control system as recited in claim 14 wherein said means for sensing is a duty cycle monitoring circuit that monitors a duty cycle of a transmitter of said car control unit.

20. The network control system as recited in claim 19 wherein said means for cutting off includes a cutoff circuit that deactivates said transmitter when said duty cycle monitoring circuit indicates that said duty cycle of said transmitter has exceeded a prespecified percentage.

21. The network control system as recited in claim 14 wherein said means for sensing is a power monitoring circuit that monitors how much power is being consumed by a transmitter of said car control unit.

22. The network control system as recited in claim 21 wherein said means for cutting off includes a power cutout circuit that deactivates said transmitter when said power monitoring circuit indicates that said transmitter has consumed more than a predetermined amount of power within a prespecified time period.

* * * * *